United States Patent
Rudel et al.

(10) Patent No.: US 7,893,579 B2
(45) Date of Patent: *Feb. 22, 2011

(54) BRUSHLESS ELECTRIC MOTOR

(75) Inventors: Christian Rudel, Königsfeld (DE); Joerg Hornberger, Dornstetten-Aach (DE); Michael Schaeuble, VS-Villingen (DE)

(73) Assignee: Ebm-Papst St. Georgen GmbH & Co. KG, St. Georgen (DE)

( * ) Notice: Subject to any disclaimer, the term of this patent is extended or adjusted under 35 U.S.C. 154(b) by 261 days.

This patent is subject to a terminal disclaimer.

(21) Appl. No.: 11/996,586

(22) PCT Filed: Jul. 27, 2006

(86) PCT No.: PCT/EP2006/006156

§ 371 (c)(1), (2), (4) Date: Jan. 23, 2008

(87) PCT Pub. No.: WO2007/012370

PCT Pub. Date: Feb. 1, 2007

(65) Prior Publication Data

US 2008/0174212 A1 Jul. 24, 2008

(30) Foreign Application Priority Data

Jul. 26, 2005 (DE) ........................ 10 2005 036 132

(51) Int. Cl.
- *H02K 29/08* (2006.01)
- *H02K 1/27* (2006.01)
- *H02K 11/00* (2006.01)
- *H02K 7/09* (2006.01)

(52) U.S. Cl. ................................. 310/68 B; 310/156.05

(58) Field of Classification Search ................... 310/43, 310/68 B, 68 R, 91, 156.05–156.07; 318/400.04–400.05, 318/652, 705, 714, 715
See application file for complete search history.

(56) References Cited

U.S. PATENT DOCUMENTS 4,317,072 A * 2/1982 Goof et al. ............. 318/400.04

(Continued)

FOREIGN PATENT DOCUMENTS

DE 196 17 134 10/1997

(Continued)

OTHER PUBLICATIONS

Zamak alloy definition from Wikipedia, the free encyclopedia; p. 12, retrieved Jan. 19, 2008.

(Continued)

*Primary Examiner*—Tran N Nguyen
(74) *Attorney, Agent, or Firm*—Milton Oliver, Esq.; Oliver Intellectual Property LLC

(57) ABSTRACT

An electric motor has a stator (224) having a bearing tube (238) made of a magnetically transparent material; it also has a rotor (222) having a rotor shaft (234) that is at least partially journaled in the bearing tube (238), and has a ring magnet (250) that is fixedly arranged on the rotor shaft (234) inside the bearing tube (238). Two magnetic-field-dependent analog sensors (248', 248") are arranged on a circuit board (246) outside the bearing tube (238), at an angular distance (PHI) from one another, in order to generate rotor position signals as a function of the rotational position of the ring magnet (250). A corresponding device (150) that serves to control the motor is provided, in order to process these rotor position signals into a signal that indicates the absolute rotational position of the rotor (222).

37 Claims, 7 Drawing Sheets

U.S. PATENT DOCUMENTS

| | | | |
|---|---|---|---|
| 4,757,220 A | | 7/1988 | Pouillange ................ 310/49 R |
| 4,841,190 A | * | 6/1989 | Matsushita et al. .......... 310/257 |
| 4,982,125 A | * | 1/1991 | Shirakawa ................... 310/88 |
| 5,977,671 A | * | 11/1999 | Kim ............................. 310/89 |
| 6,774,599 B2 | * | 8/2004 | Ishii ............................ 318/652 |
| 7,023,123 B2 | * | 4/2006 | Suzuki et al. ............. 310/261.1 |
| 7,394,174 B2 | * | 7/2008 | Blase et al. ................... 310/43 |
| 2003/0146727 A1 | | 8/2003 | Ishii ............................ 318/652 |
| 2006/0283278 A1 | | 12/2006 | Koster et al. ................. 74/414 |
| 2008/0174212 A1 | * | 7/2008 | Rudel et al. ............... 310/68 B |

FOREIGN PATENT DOCUMENTS

| | | | |
|---|---|---|---|
| DE | 196 53 209 | | 6/1998 |
| DE | 100 03 129 | | 8/2001 |
| DE | 100 18 728 | | 10/2001 |
| EP | 1 126 582 | | 8/2001 |
| FR | 2 631 378 A | | 11/1989 |
| JP | 61121761 A | * | 6/1986 |
| JP | 08023666 A | * | 1/1996 |

OTHER PUBLICATIONS

Patent Abs. of Japan, abstracting JP-09-182 403-A, Takahashi/Nippon Seiko KK, pub. Jul. 11, 1997.

Patent Abs. of Japan, abstracting JP 2000-134 875-A, Watanuki/Calsonic Corp., pub. May 12, 2000.

* cited by examiner

BRUSHLESS ELECTRIC MOTOR

CROSS-REFERENCE

This application is a section 371 of PCT/EP06/06156, filed 27 Jun. 2006 and published 1 Feb. 2007 as WO 2007-12370-A1.

FIELD OF THE INVENTION

The invention relates to an electric motor for sensing a rotor position, and in particular the absolute value of a rotor position.

BACKGROUND

WO 2004/059830 A2 (whose US National Phase became U.S. Pat. No. 7,049,776) discloses a rotor position sensor arrangement for an electric motor having a multi-pole sensor magnet, in which arrangement a rotor position signal is converted into a digital value with a 2-bit resolution. This digital value makes it possible to obtain information from the rotor position signal even within the angle range of one sensor pole (e.g. within region 550 in FIG. 5 below), so that an absolute value for the rotor position can be generated.

SUMMARY OF THE INVENTION

It is therefore an object of the present invention to make available a novel arrangement for sensing the rotor position in an electric motor.

According to a first aspect of the invention, this object is achieved by an electric motor having, secured to its rotor shaft, a ring magnet with a sinusoidal flux profile along its circumference, and a rotor position sensors which maps a property of the magnetic flux from the ring magnet to ascertain a absolute value representing the rotor position. This electric motor comprises a stator, a rotor having a rotor shaft and a rotor magnet, a ring magnet arranged nonrotatably on the shaft, and at least one rotor position sensor. The rotor magnet has n pole pairs. The ring magnet is arranged at least partially between the rotor shaft and the at least one rotor position sensor, and it is magnetized in such a way that it has a maximum of n pole pairs, and that a substantially sinusoidal magnetic flux profile occurs at its circumference. The at least one rotor position sensor serves to generate an analog signal that maps a property of the magnetic flux and is suitable for determining an absolute value of the rotor position.

What is thereby obtained is an electric motor having a rotor position arrangement that enables the absolute value of the motor's rotor position to be determined at any point in time.

According to a further aspect, this object is achieved by an electric motor having a ring magnet located at least partially inside a magnetically transparent subregion of the bearing tube which supports the rotor. This electric motor has a stator having a bearing tube, a rotor having a rotor shaft, a ring magnet, and at least one rotor position sensor. The bearing tube is configured from magnetically transparent material, e.g. from die-cast aluminum. The rotor shaft is arranged at least partially in the bearing tube. The ring magnet is arranged nonrotatably on the shaft, and likewise arranged at least partially inside the bearing tube. The at least one rotor position sensor is arranged outside the bearing tube and serves to generate a rotor position signal as a function of the rotational position of the ring magnet. What is thereby obtained is a motor having a rotor position arrangement that enables the absolute value of the motor's rotor position to be determined at any point in time.

BRIEF FIGURE DESCRIPTION

Further details and advantageous refinements of the invention are evident from the exemplifying embodiments, in no way to be understood as a limitation of the invention, that are described below and depicted in the drawings.

Figure 5:
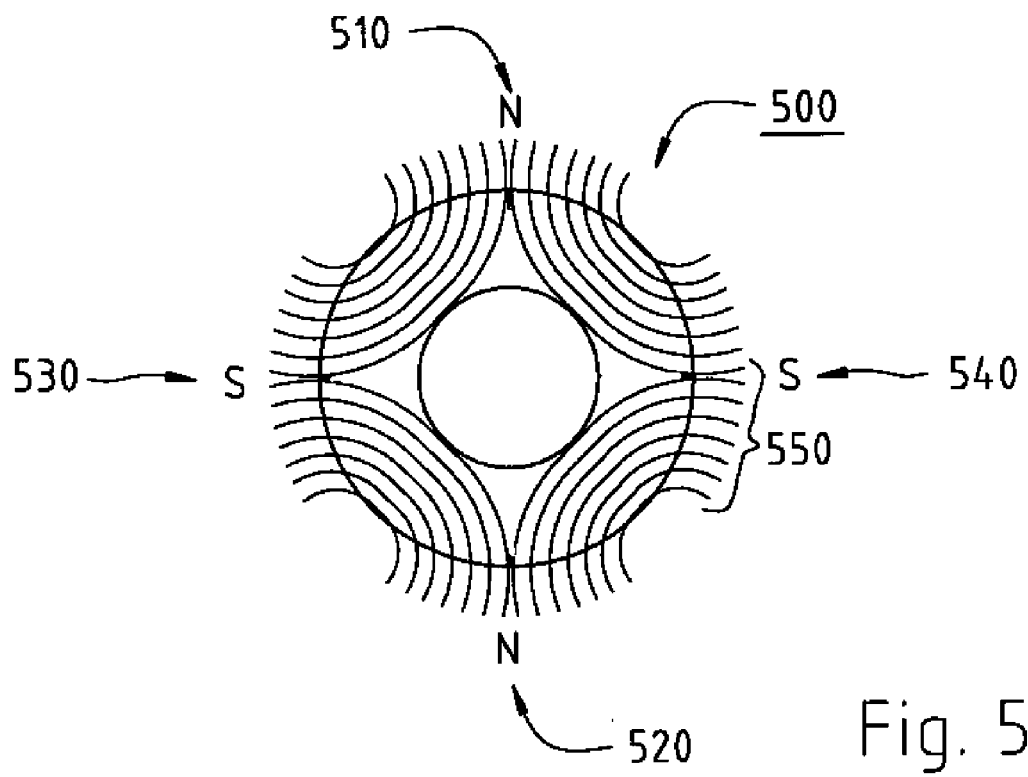
Figure 6:
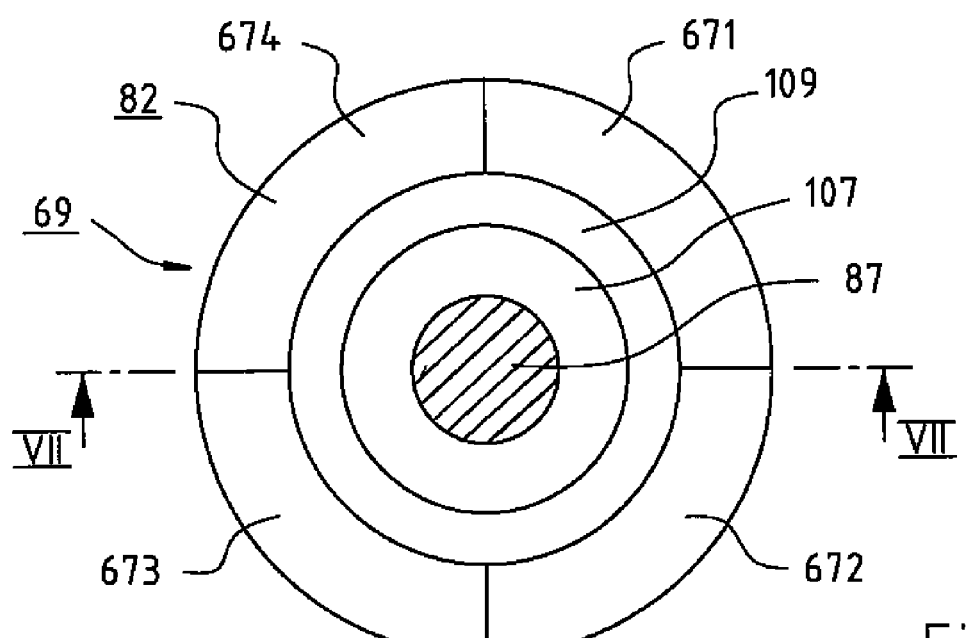
Figure 7:
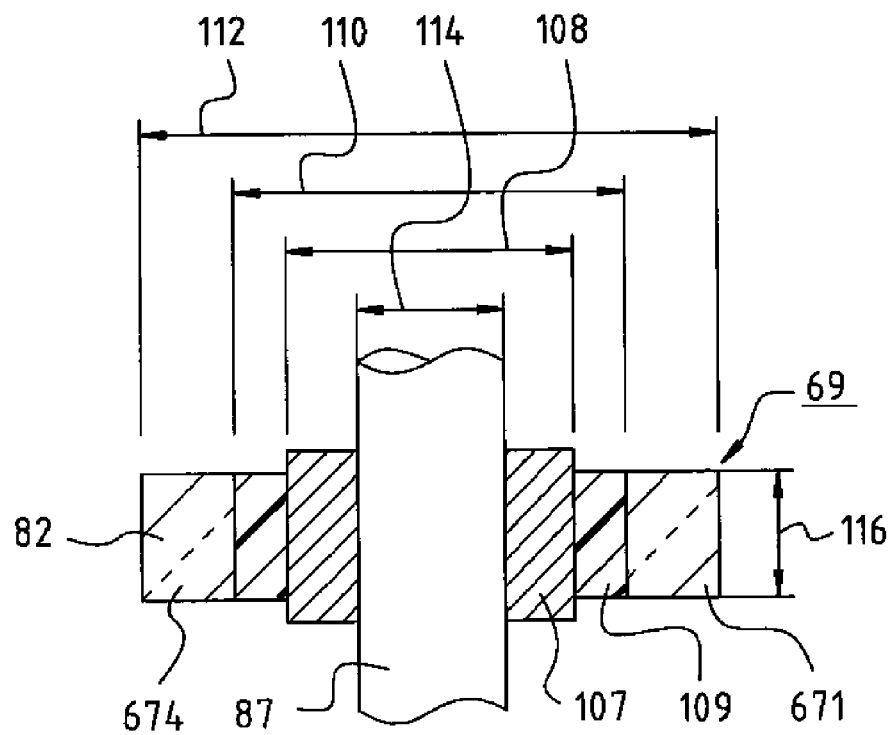
Figure 8:
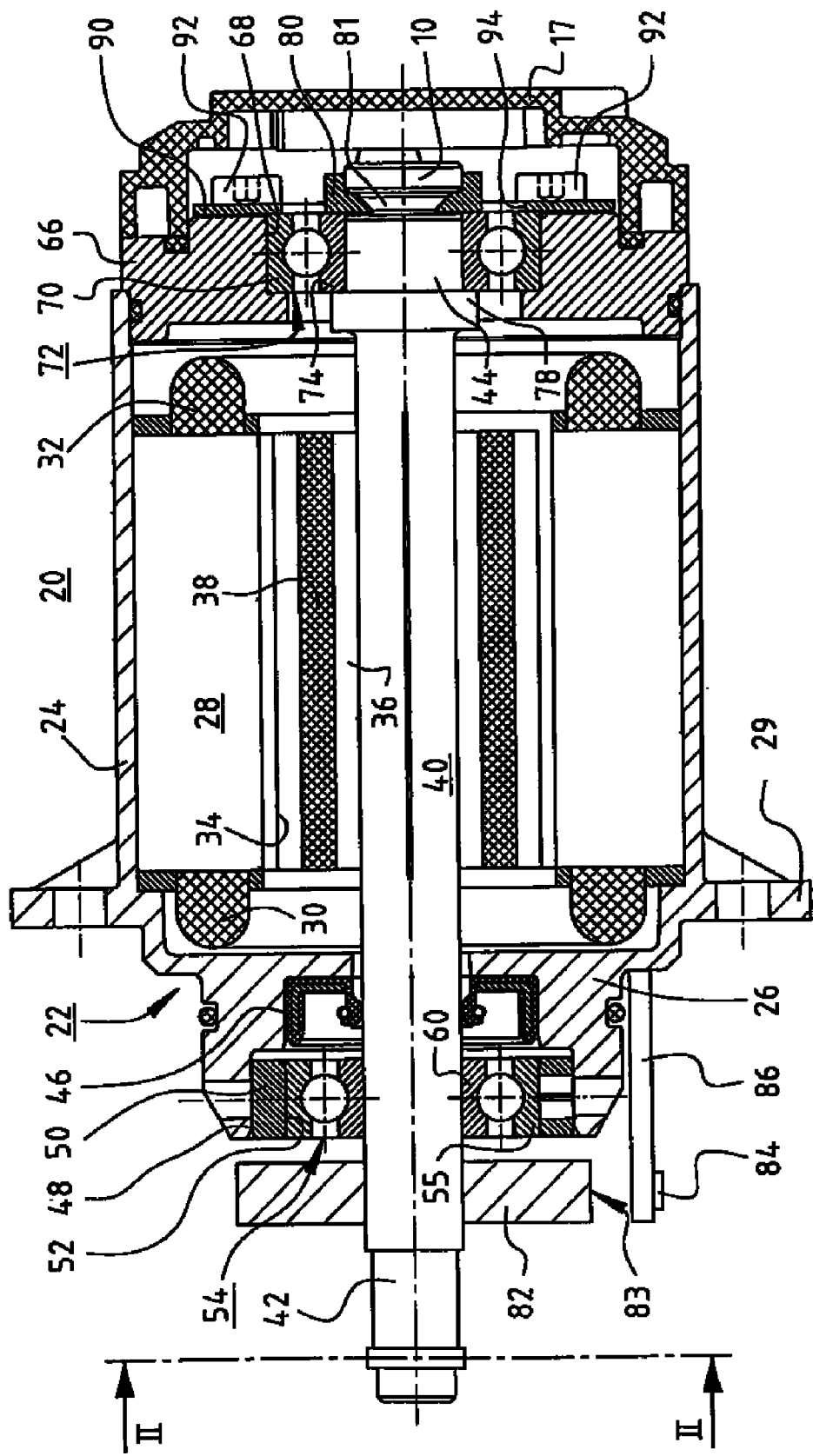
Figure 9:
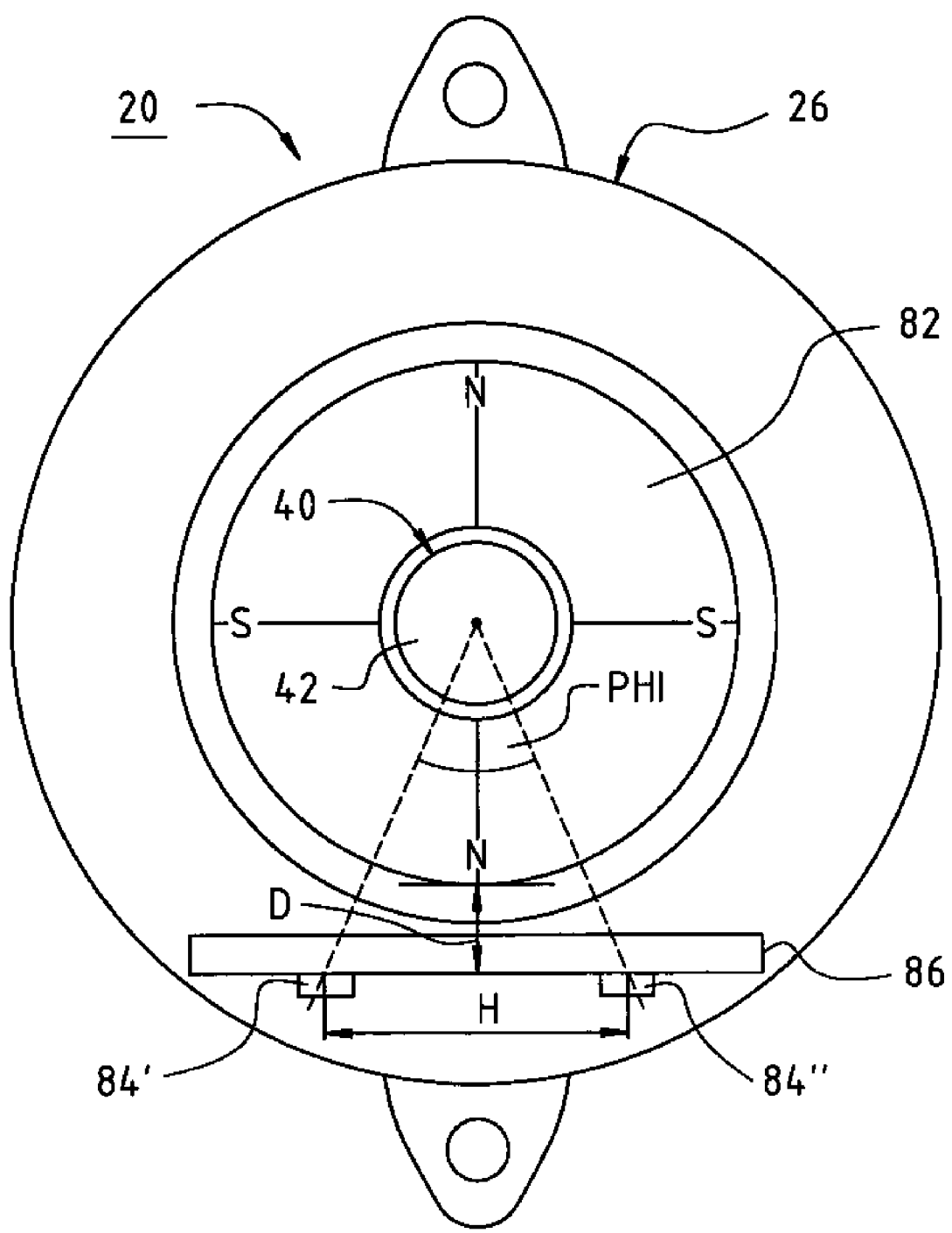

FIG. 5 schematically depicts the magnetic field of a four-pole sensor magnet according to a second embodiment of the invention;

FIG. 6 is a top view of a preferred sensor ring magnet arrangement;

FIG. 7 is a section through the sensor ring magnet arrangement along line VII-VII of FIG. 6;

FIG. 8 is an enlarged longitudinal section through an example of an internal-rotor motor that is equipped with a rotor position sensor arrangement according to the present invention; and FIG. 9 is a section along line II-II of FIG. 8, at enlarged scale.

DETAILED DESCRIPTION

In the description that follows, the terms "left," "right," "upper," and "lower" refer to the respective Figure of the drawings, and can vary from one Figure to the next as a function of a particular orientation (portrait or landscape) that is selected. Identical or identically functioning parts are labeled with the same reference characters in the various Figures, and usually are described only once.

Figure 1:
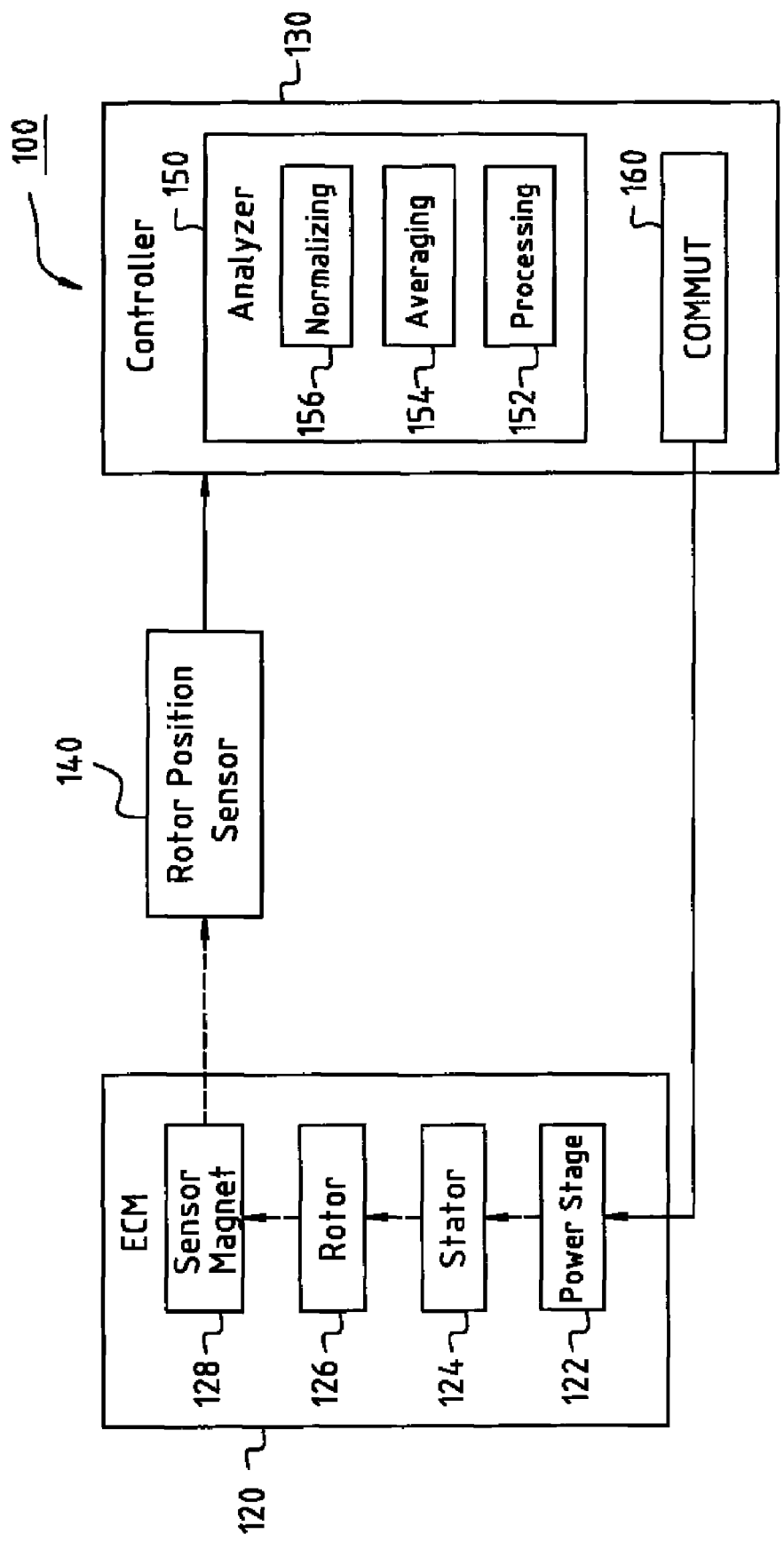
FIG. 1 is a block diagram of a preferred embodiment of an ECM having a rotor position sensor arrangement.

FIG. 1 is a block diagram illustrating the functional principle of an apparatus 100 for operating an ECM 120 having a rotor position sensor arrangement according to the present invention. The rotor position sensor arrangement is configured on the one hand to generate rotor position signals and on the other hand to determine absolute values for the rotor position of ECM 120 from the rotor position signals that have been generated.

According to an embodiment of the present invention, apparatus 100 encompasses an ECM 120 having a rotor 126 that comprises a sensor magnet 128, and having a stator 124 having at least one stator strand. Associated with ECM 120 is a power stage 122 for influencing the motor current in the at least one stator strand of stator 124.

Apparatus 100 encompasses a controller 130 that usefully is configured as a microcontroller, and that is connected to ECM 120. Controller 130 encompasses a commutation controller 160 (COMMUT) and is connected on the input side to at least one rotor position sensor 140 that is associated with ECM 120. Commutation controller 160 generates commutation signals for power stage 122 of ECM 120 as a function of rotor position signals that are made available by rotor position sensor 140.

Controller stage 130 encompasses a device 150 (Analyzer) for ascertaining the rotor position, having a normalizing unit 156, an averaging unit 154, and a processing unit 152. Device 150 constitutes, together with rotor position sensor 140 and with sensor magnet 128, the rotor position sensor arrangement according to the present invention.

Rotor position sensor 140 is preferably an analog rotor position sensor. The invention is not, however, limited to one specific rotor position sensor type, but instead different kinds of rotor position sensors can be used. For example, analog Hall sensors such as, for example, analog Hall sensors of the A1321 type, AMR Hall sensors, or GMR (giant magnetoresistive) sensors, can be utilized as rotor position sensors. Programmable sensors, e.g. of the Sentron 2SA-10 type, can also be used.

When apparatus 100 is in operation, an operating voltage is delivered to the at least one stator strand of stator 124 of ECM 120. The currents flowing through the at least one stator strand are controlled, by the commutation signals made available by commutation controller 160 of power stage 122, in such a way that rotor 126 rotates at a specific rotation speed ($\omega$).

The rotation of rotor 126 produces a rotation of sensor magnet 128 at the same rotation speed ($\omega$) at which rotor 126 is rotating, rotor position signals being generated by rotor position sensor 140. These signals are delivered to device 150 which serves to determine, at each point in time, from the present rotor position signal, an absolute value for the rotational position of rotor 126.

According to a preferred embodiment of the invention, the absolute values for the rotor position of rotor 126 are used by commutation controller 160 in controller 130, upon the generation of suitable commutation signals, to bring about the electromagnetic interaction between rotor 126 and the at least one strand of stator 124 that is necessary for rotor 126 to rotate at the specific rotation speed $\omega$.

The manner in which apparatus 100 functions for the determination of absolute values for the rotor position of rotor 126 will be further described below with reference to FIGS. 2 to 9.

Figure 2:
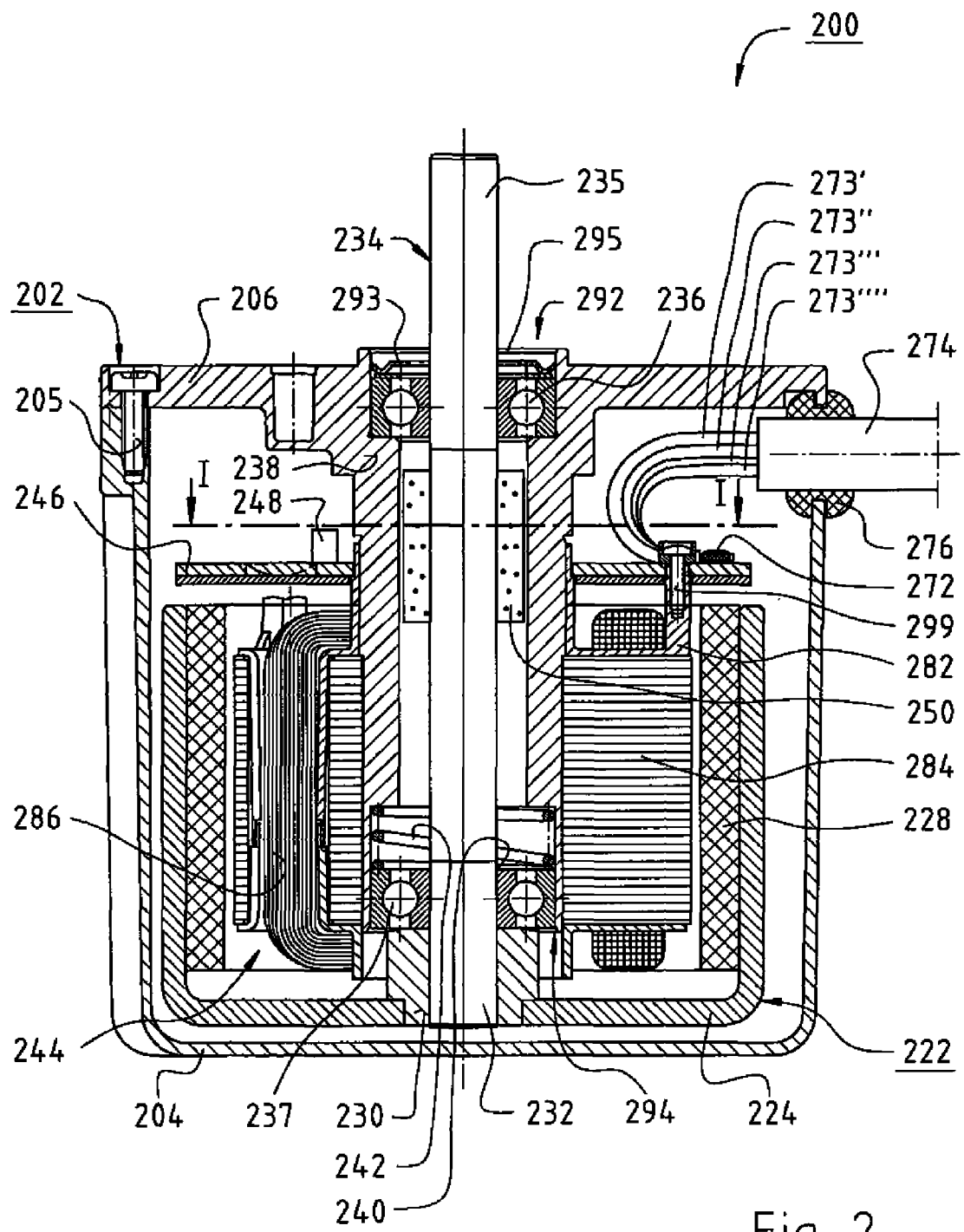
FIG. 2 is an enlarged longitudinal section through an example of an external-rotor motor that is equipped with a rotor position sensor arrangement according to the present invention.

FIG. 2 is an enlarged longitudinal section through an external-rotor motor 200 that serves to drive an external component (not depicted), for example a fan wheel. As is evident from FIG. 2, motor 200 is arranged in a housing 202 that comprises a substantially cylindrical housing part 204 at whose upper end a mounting flange 206 is mounted by means of at least one screw 205.

Motor 200 has an external rotor 222 having a rotor cup 224, which cup comprises on its inner side a radially magnetized rotor magnet 228. Rotor magnet 228 has n pole pairs, where n=1, 2, . . . .

Rotor cup 224 is equipped with a base 230 in which is mounted a lower shaft end 232 of a rotor shaft 234 whose upper, exposed shaft end is labeled 235. The external component can be driven by the upper, exposed shaft end 235. Upper, exposed shaft end 235 is therefore also referred to hereinafter as the "driving end" of shaft 234. Rotor cup 224 and base 230 are preferably configured integrally; lower shaft end 232 can be mounted in base 230 by Zamak injection. Lower shaft end 232 can likewise be used for driving. For this, an opening (not depicted) is provided in housing part 204 in the region of lower shaft end 232. An advantage of the sensor arrangement according to the present invention is that, regardless of the type of motor, neither of the shaft ends is occupied by the sensor arrangement.

In the exemplifying embodiment depicted in FIG. 2, rotor shaft 234 is journaled almost entirely (i.e. with the exception of driving end 235) in a magnetically transparent bearing tube 238 that preferably is configured integrally with mounting flange 206. An upper rolling bearing 236 arranged on the A side of motor 200 and a lower rolling bearing 237 arranged on the B side of motor 200 serve for radial journaling of shaft 234. Upper rolling bearing 236 is pressed into a recess 292 in mounting flange 206, and is retained there by a retaining ring 293 that is covered by a sealing ring 295. Lower rolling bearing 237 is mounted in a recess 294 at the lower end of bearing tube 238 by being pressed in, and the outer ring of said bearing abuts, with upper end 240 (in FIG. 2) against a compression spring 242 arranged in bearing tube 238.

Internal stator 244 of motor 200 is mounted on the outer side of bearing tube 238. Internal stator 244 encompasses a stator carrier 282 having a stator lamination stack 284 and a stator winding 286. Arranged at the upper end of stator carrier 282 is a circuit board 246 that is mounted via a screw 299 on stator carrier 282 and serves to support the motor electronics.

Depicted on circuit board 246 is a terminal connection 272 that serves for electrical connection of the motor electronics via flexible individual conductors 273', 273", 273'", and 273"" which are bundled into a lead 274. Lead 274 is guided out of housing part 204 through a seal 276.

At least one rotor position sensor 248 is arranged on circuit board 246 and thus in the region outside bearing tube 238. The sensor serves to generate rotor position signals as a function of the rotational position of a ring magnet 250 that is arranged nonrotatably on rotor shaft 234 and is preferably mounted nondetachably thereon.

According to FIG. 2, ring magnet 250 is arranged at substantially the same height, in the axial direction of rotor shaft 234, as rotor position sensor 248. Ring magnet 250 is spaced away from rotor magnet 228 in the axial direction of shaft 234 in order to avoid influencing rotor position sensor 248 when rotor position signals are generated by the stray flux of rotor magnet 228. Ring magnet 250 and rotor magnet 228 are preferably arranged relative to one another in such a way that each pole transition of ring magnet 250 corresponds to a pole transition of rotor magnet 228.

According to a preferred embodiment of the invention, ring magnet 250 is magnetized in such a way that it comprises a maximum of n pole pairs, n being (as described above) the number of pole pairs of rotor magnet 228. Ring magnet 250 is preferably magnetized in pole-oriented fashion, i.e. diametrically or sinusoidally, so that a substantially sinusoidal magnetic flux profile occurs at its outer circumference.

The number and arrangement of rotor position sensor or sensors 248 is coordinated with the number and magnetization of the pole pairs of ring magnet 250, to ensure that the rotor position signals for controlling the current flow of stator winding 286 are unambiguous. When two analog Hall sensors are used, for example, they are preferably arranged at a distance of 90° el. from one another. For the case in which ring magnet 250 has only one pole pair in this context, the Hall sensors must therefore be arranged at a distance of 90° mech. from one another. For a ring magnet 250 having two pole pairs, the result is a distance of 45° mech. for the Hall sensors, etc. The distance of rotor position sensor or sensors 248 from ring magnet 250 can be more than 10 mm via a relatively large air gap, depending on the magnetization of ring magnet 250.

As is evident from FIG. 2, rotor magnet 228 terminates at its upper and lower sides flush with the upper and lower sides, respectively, of stator winding 286. As a result, however, the stray flux of rotor magnet 228 can act on the at least one rotor position sensor 248 and thus falsify the rotor position signal. To prevent the at least one rotor position sensor 248 from being influenced by the stray flux of rotor magnet 228 upon generation of the rotor position signals, the height of rotor magnet 228 can alternatively be shortened in such a way that its upper and lower sides terminate flush with the upper and lower sides, respectively, of stator lamination stack 284.

Bearing tube 238 must be configured so that it enables measurement of the magnetic field generated by sensor magnet 250 at the location of rotor position sensor 248 outside the bearing tube. For that purpose, said tube is preferably configured, at least in the region between rotor position sensor 248 and sensor magnet 250, from a magnetically transparent material.

Operation

During the operation of external-rotor motor 200, a supply voltage is applied to a power stage associated with motor 200 (e.g. to power stage 122 of FIG. 1) in order to cause current flow in stator winding 286. The supply voltage is preferably a substantially constant DC voltage that is generated by a power-supply unit or a battery, and is converted by the electromagnetic interaction between stator winding 286 and rotor magnet 228 into rotations of external rotor 222, and thus of rotor shaft 234 and of ring magnet 250.

Upon rotation of ring magnet 250, the magnetic field acting on rotor position sensor 248 continuously changes as a function of the magnetic flux profile at the outer circumference of ring magnet 250, so that rotor position sensor 248 generates sinusoidal or cosinusoidal rotor position signals. According to the present invention, absolute values for the rotor position of external rotor 222 are determined from these rotor position signals.

For determination of the absolute values, the rotor position signals are preferably normalized by period or by means of period averages so that deviations of the rotor position signals from corresponding target values do not cause errors in the calculation of the rotor position angle. This normalization step is carried out by a suitable normalization unit, e.g. normalization unit 156 of FIG. 1. The normalized rotor position signals are averaged by a unit for determining an average, e.g. averaging unit 154 of FIG. 1, in order to increase measurement accuracy and improve the quality of the resulting signals. The resulting signals are converted by a processing unit, e.g. processing unit 152 of FIG. 1, into absolute values for the rotor position angle and e.g. for the rotor position of external rotor 222. Suitable conditioning methods for the rotor position signals are described, for example, in WO 2004/059830 A2 (and corresponding U.S. Pat. No. 7,049,776) and therefore need not be further described here.

According to a preferred embodiment of the invention, the absolute values for the rotor position of external rotor 222 are used to generate commutation signals, e.g. by means of commutation controller 160 of controller 130 of FIG. 1. The commutation signals serve to control the currents flowing through stator winding 286. Advantageously, there is no need here for an initialization phase in which rotor 222 is rotated into a defined starting state in order to assign an initial rotor position to an absolute electrical angle of rotor magnet 228 that is necessary for commutation. On the contrary, the absolute value of the rotor position is known at every point in time, so that the absolute electrical angle of rotor magnet 228 that is necessary for commutation is also known at all times. The initialization phase can thus be dispensed with, since the absolute values are drawn upon for generation of the commutation signals.

Figure 3:
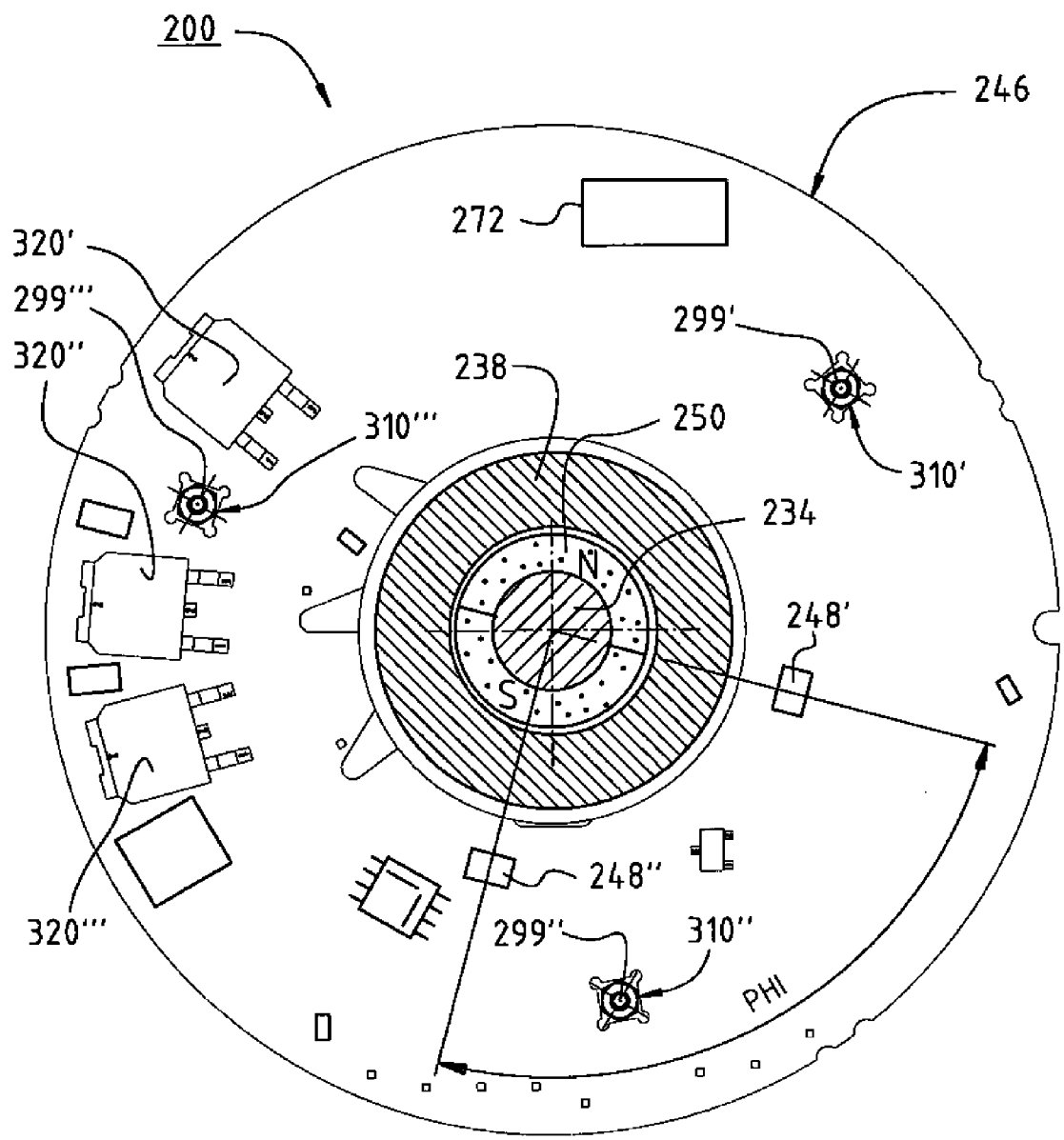
FIG. 3 is a section along line I-I in FIG. 2, at enlarged scale.

FIG. 3 is a section along line I-I of FIG. 2, at enlarged scale, through a preferred embodiment of external-rotor motor 200 having a two-pole ring magnet 250. The number n of pole pairs of ring magnet 250 in FIG. 3 is n=1. The two-pole ring magnet 250 is, as described with reference to FIG. 2, arranged on rotor shaft 234, fixed against relative rotation with respect thereto, and at least partially within bearing tube 238.

As FIG. 3 clearly shows, circuit board 246 is mounted on stator carrier 282 (not visible) with three screws 299', 299'', 299''' that are passed through corresponding bores 310', 310'', 310'''. The motor electronics arranged on the upper side of the circuit board (cf. FIG. 2) encompass, by way of example, terminal connection 272 and schematically depicted power MOSFETs transistors) 320', 320'', 320'''.

Two Hall sensors 248', 248'', e.g. analog SMD (Surface Mounted Device) Hall sensors, are arranged on the upper side of circuit board 246 at an angle PHI from one another. Because ring magnet 250 according to FIG. 3 has two poles, this angle PHI is, as described above, 90° el., so that the two Hall sensors are arranged with a distance of 90° mech. from one another.

Figure 4:
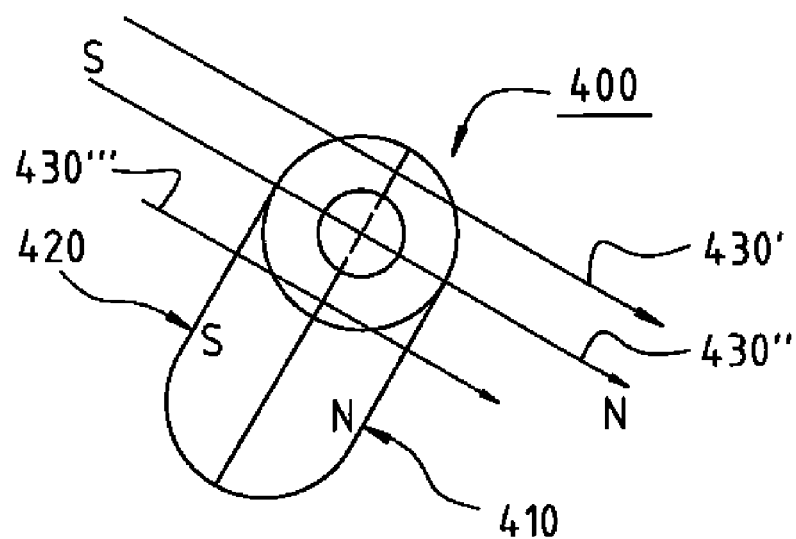
FIG. 4 is a perspective view of a first embodiment of the two-pole sensor magnet of FIGS. 2 and 3.

FIG. 4 is a perspective view of an example of a ring magnet 400 that is suitable, according to a first embodiment of the invention, for implementing ring magnet 250 of FIGS. 2 and 3.

As is evident from FIG. 4, ring magnet 400 is substantially cylindrical in shape and is magnetized diametrically, i.e. ring magnet 400 has one magnet-pole pair or two magnet poles: a North pole 410 (N) and a South pole 420 (S). The magnetic flux profile between South pole 420 and North pole 410 is represented by magnetic field lines 430', 430'', 430''', which serve to illustrate a diametrical magnetization.

Be it noted, however, that North pole 410 and South pole 420 of ring magnet 400 form substantially a spherical magnetic field. A substantially sinusoidal flux profile thus results at the outer circumference of ring magnet 400. Because the orientation of the magnetic field at the outer circumference of ring magnet 400 at each magnetic pole permits an unambiguous inference in each case as to the respective rotor position, the generation of suitable rotor position signals by means of the particular rotor position sensors being used, e.g. rotor position sensors 248', 248'' of FIG. 3, is preferably based, when ring magnet 400 is used as a sensor magnet, on the orientation or direction of the magnetic field. The distance between ring magnet 400 and rotor position sensors 248', 248'' must be selected appropriately in this context.

FIG. 5 schematically depicts the magnetic field of a ring magnet 500 that is suitable, according to a preferred embodiment, for implementing ring magnet 250 of FIGS. 2 and 3.

Ring magnet 500 is configured with four poles and is shown in a top view. It has two magnet-pole pairs, namely two North poles 510, 520 (N) and two South poles 530, 540 (S). Ring magnet 500 is sinusoidally magnetized according to the present invention, thus resulting in a substantially sinusoidal magnetic flux profile at the outer circumference of ring magnet 500. The magnetic flux profile between the individual magnet poles of ring magnet 500 is indicated by corresponding magnetic field lines. For example, the magnetic flux profile between South pole 540 and North pole 520 is illustrated by magnetic field lines 550. In terms of a clock face, North pole 510 is at its maximum at the 12-o'clock position, South pole 540 at the 3-o'clock position, etc.

When ring magnet 500 is used as a sensor magnet, the generation of suitable rotor position signals by the respective rotor position sensors being used, e.g. rotor position sensors 248', 248'' of FIG. 3, is preferably based on evaluation of the intensity of the magnetic field. The distance between ring magnet 500 and rotor position sensors 248', 248'' is not critical in this context.

Ring magnet 500 is preferably substantially cylindrical in shape. Hard ferrite compound 13/22p per DIN 17 410 is suitable, for example, as a magnetic material.

FIG. 6 is a top view of a sensor ring magnet arrangement 69 that can be used in both internal-rotor and external-rotor motors, and FIG. 7 is a section through sensor ring magnet arrangement 69, sensor ring magnet arrangement 69 being arranged on a shaft 87. Sensor ring magnet arrangement 69 comprises sensor magnet 82 having the four sensor poles 671, 672, 673, and 674; a metal ring 107; and a plastic ring 109 that connects sensor poles 671 to 674 to metal ring 107.

Metal ring 107 sits on shaft 87 and is nonrotatably connected thereto. Brass is preferably used for metal ring 107. Plastic 109 is introduced, for example by way of an injection-molding process, between metal ring 107 and sensor magnet 82 in order to connect them and at the same time to enable compensation for stresses resulting from thermal expansion, which stresses might otherwise cause sensor magnet 82 to burst.

The outside diameter of sensor magnet 82 is labeled 112 and is, for example, 37 mm. The outside diameter is preferably in the range of 15 mm to 50 mm, more preferably in the range of 20 to 40 mm.

The inside diameter of sensor magnet 82 or the outside diameter of plastic ring 109 is labeled 110. Length 110 is, for example, 27 mm.

The inside diameter of plastic ring 109 or the outside diameter of metal ring 107 is labeled 108. Length 108 is, for example, 20 mm.

The diameter of shaft 87 is labeled 114 and is, for example, 8 mm. Preferred values for diameter 114 of the shaft are in the range of 5 to 15 mm, although larger and smaller diameters are possible depending on the motor size.

The inside diameter of metal ring 107 is preferably selected so that a good connection with shaft 87 is created. The use of an inner metal ring 107 is advantageous because sensor magnet 82 can be produced in one or more standard sizes, and adaptation of sensor ring magnet 69 to shaft 87 can be accomplished by way of a change (favorable in terms of manufacture) in inside diameter 114 of metal ring 107.

The width of magnet material 71 to 74 is labeled 116, and width 116 for one sensor magnet is, for example, 7 mm. The width for an exclusively sensor magnet, i.e. one that does not simultaneously serve as a rotor magnet, is preferably in the range of 3 mm to 20 mm, more preferably in the range of 5 mm to 15 mm, and particularly preferably in the range of 6 mm to 12 mm.

The number of sensor poles SP is preferably SP=2, 4, 6, or 8, and particularly preferably SP=2 or 4.

In applications in which sensor ring magnet 69 is arranged in a corrosive environment, sensor magnet 82 can additionally be surrounded by a (preferably magnetically nonconductive) corrosion-resistant material. It is possible, for example, to weld the sensor magnet into magnetically nonconductive special steel. With a sensor ring magnet 69 of this kind, for example, an immersion motor in which the shaft is surrounded by cooling fluid can be implemented.

FIG. 8 is an enlarged longitudinal section through an electronically commutated internal-rotor motor 20 that serves to drive an external component (not depicted), for example a fan wheel. Internal-rotor motor 20 has a housing 22 that comprises a cylindrical housing part 24, an A-side bell 26 and a mounting flange 29 on the A side of motor 20, and a B-side bell 66 and a housing cover 17 on the B side of motor 20.

The lamination stack of an external stator 28 is arranged in cylindrical housing part 24, the winding ends of said stator being indicated at 30 and 32. Stator 28 has an internal recess 34 in which a rotor 36 having a rotor magnet 38 is arranged on a rotor shaft 40 whose driving end is labeled 42 and whose inner shaft end is labeled 44. The rotor magnet has n pole pairs, where n=1, 2, . . . . A motor of this kind can also be referred to as a permanently excited synchronous internal-rotor machine.

B-side bell 66 is mounted in the right, open end of cylindrical housing part 24. Said bell has a recess 68 for a rolling bearing 72 having an outer ring 70 and an inner ring 74. Inner ring 74 is mounted on shaft end 44. Rotor shaft 40 has for this purpose an annular collar 78 with whose right shoulder the shaft abuts against the left side of inner ring 74. Abutting against its right side is a molded part 80 that is pressed toward rotor shaft 40 by countersunk head 81 of a retaining member 10, said part being approximately annular. Molded part 80 serves to secure inner ring 74 on rotor shaft 40.

Secure retention of outer ring 70 is provided by a flat, annular part 90 that is mounted on its outer periphery, by means of a plurality of screws 92 (preferably three regularly distributed screws), on B-side bell 66, said part abutting with its radially inner part 94 against outer ring 70 and pressing the latter to the left. (Recess 68 is slightly shorter than outer ring 70.)

A seal 46 for rotor shaft 40 is provided in the usual way in A-side bell 26. Also located there is a recess 48 in which a ring 50 is mounted. Ring 50 surrounds an outer ring 55 of a rolling bearing 54. Inner ring 60 of rolling bearing 54 is pressed onto rotor shaft 40.

A circuit board 86, arranged substantially parallel to rotor shaft 40, is mounted on A-side bell 26. Located on the underside of circuit board 86 is at least one rotor position sensor 84 that serves to generate rotor position signals as a function of the rotational position of a ring magnet 82. Ring magnet 82 is in this case fixedly arranged on rotor shaft 40 between rolling bearing 54 and driving end 42, and is preferably connected nondetachably to shaft 40. Ring magnet 82 is preferably magnetized in such a way that it has a maximum of n pole pairs (n being the number of pole pairs of rotor magnet 38) and that a substantially sinusoidal magnetic flux profile occurs at its circumference 83.

According to FIG. 8, ring magnet 82 is arranged, in the axial direction of rotor shaft 40, at substantially the same height as the at least one rotor position sensor 84. Ring magnet 82 is preferably spaced away from rotor magnet 38 with reference to the axial direction of shaft 40, in order to prevent rotor position sensor 84 from being influenced by the stray flux of rotor magnet 38 upon generation of the rotor position signals. Ring magnet 82 and rotor magnet 38 are preferably arranged relative to one another in such a way that each pole transition of ring magnet 82 corresponds to a pole transition of rotor magnet 38.

The arrangement of rotor position sensor or sensors 84 is coordinated with the number and magnetization of the pole pairs of ring magnet 82, to ensure that the rotor position signals for controlling the current flow of stator winding 28 are unambiguous. When two analog Hall sensors are used, for example, they are preferably arranged at a distance of 90° el. from one another. For the case in which ring magnet 82 has only one pole pair in this context, the Hall sensors must therefore be arranged at a distance of 90° mech. from one another. For a ring magnet 82 having two pole pairs, the result is a distance of 45° mech. for the Hall sensors, etc. The distance of rotor position sensor or sensors 84 from ring magnet 82 can be more than 10 mm via a relatively large air gap, depending on the magnetization of ring magnet 82. The construction and magnetization of ring magnet 82 are analogous to the embodiments described with reference to FIGS. 4 to 7, and will therefore not be further described here.

The manner of operation of internal-rotor motor 20 is analogous to the manner of operation of external-rotor motor 200 of FIG. 2. Commutation control, as well as the generation of rotor position signals and the determination of absolute values for the rotor position of rotor 36 of internal-rotor motor 20, are likewise accomplished analogously to the operations for external-rotor motor 200 of FIG. 2. The manner of operation of internal-rotor motor 20, commutation control, and the generation of rotor position signals and the determination of absolute values for internal-rotor motor 20 will therefore not be further described here.

FIG. 9 is a section along line II-II in FIG. 8, at enlarged scale, through a preferred embodiment of internal-rotor motor 20 having a four-pole ring magnet 82. The number n of pole pairs of ring magnet 82 in FIG. 9 is n=2. As described in FIG. 8, four-pole ring magnet 82 is fixedly arranged on rotor shaft 40 between driving end 42 and A-side bell 26.

As is clearly evident from FIG. 9, the upper and lower sides of circuit board 86 are arranged substantially parallel to the axial orientation of rotor shaft 40 and are mounted on A-side bell 26. Provided on the underside of circuit board 86 are, for example, two rotor position sensors 84', 84".

Examples of values for individual components of internal-rotor motor 20 having a four-pole ring magnet 82, according to a preferred embodiment, are indicated below:

| | |
|---|---|
| Distance D (lower side of circuit board 86 to outer side of ring magnet 82): | 10 mm |
| Distance H (center of sensor 84' to center of sensor 84"; sensor type: SMD Hall): | 19 mm |
| Angle PHI (sensor 84' to sensor 84"): | 90° el. or 45° mech. |
| Diameter of rotor shaft 40: | 6 mm |
| Diameter of ring magnet 82: | 36.6 mm |

Many variants and modifications are of course possible within the scope of the present invention.

What is claimed is:

1. An electric motor comprising
a stator (124) having a bearing tube, which tube is implemented, at least in a subregion, from a magnetically transparent material;
a rotor (38; 112) having a rotor shaft (40; 232) and having a rotor magnet (38; 228) having n pole pairs;
a ring magnet fixedly connected to the shaft (40; 232), and arranged at least partially in the bearing tube, which magnet is magnetized in such a way that it has a maximum of n pole pairs, where n is a positive integer and that a substantially sinusoidal magnetic flux profile occurs at its circumference;
at least one rotor position sensor (84', 84"; 248', 248") for generating a rotor position signal that maps a property of the magnetic flux from said ring magnet and is suitable for ascertaining an absolute value of the rotor position, said at least one rotor position sensor being arranged outside the ring magnet (82; 250) being arranged at least partially between the rotor shaft (232) and the at least one rotor position sensor (84', 84"; 248', 248").

2. The electric motor according to claim 1, wherein the ring magnet (500) is magnetized in a pole-oriented lateral configuration.

3. The electric motor according to claim 1, wherein the ring magnet (82) is magnetized diametrically.

4. The electric motor according to claim 1, wherein the ring magnet (250) is axially offset, along a longitudinal axis of said rotor shaft, relative to the rotor magnet (228), in order to minimize influence by the magnetic flux of the rotor magnet (228) on the rotor position signal generated by the at least one rotor position sensor (84', 84"; 248', 248").

5. The electric motor according to claim 1, wherein the rotor shaft (232) comprises an exposed shaft end (235), and the ring magnet (250) is arranged, with reference to the axial dimension of the shaft (40; 332), between the exposed shaft end (235) and the rotor magnet (228).

6. The electric motor according to claim 5, which is arranged in
a housing (26) out of which the exposed shaft end (42) protrudes,
the ring magnet (82) being arranged between the exposed shaft end (42) and the housing (26).

7. The electric motor according to claim 1, wherein
the ring magnet and the rotor magnet are arranged relative to one another in such a way that each pole transition of the ring magnet corresponds to a pole transition of the rotor magnet.

8. The electric motor according to claim 1, wherein
two rotor position sensors (84', 84"; 248', 248") are provided, which sensors are arranged at a distance of approximately 90° electrical from one another with reference to the rotation axis of the shaft.

9. The electric motor according to claim 1, wherein
the ring magnet comprises two pole pairs and the electric motor comprises two rotor position sensors, which sensors are arranged at a distance of approximately 45° mechanical from one another with reference to the rotation axis of the shaft.

10. The electric motor according to claim 1, wherein
the at least one rotor position sensor (84', 84"; 248', 248") is configured as an analog rotor position sensor.

11. The electric motor according to claim 1, further comprising
a device (150) for ascertaining the rotational position of the rotor (126), which device is configured as an absolute value sensor for the rotational position of the rotor and serves to determine, at any point in time, from the at least one rotor position signal, the absolute value of the rotor position.

12. The electric motor according to claim 11, which comprises
a microprocessor (100) that constitutes at least a part of the device (150) for ascertaining the absolute value of the rotational position of the rotor (126).

13. An electric motor that comprises:
an internal stator (244) having a bearing tube (238), which tube is implemented, at least in a subregion, from a magnetically transparent material, and includes first and second bearings (236, 237);
an external rotor (222) having a rotor shaft (232), which shaft is arranged at least partially in the bearing tube (238);
a ring magnet (250) that is fixedly arranged on the shaft (232) between the first and second bearings (236, 237) and at least partially inside a magnetically transparent subregion of the bearing tube (238);
at least one rotor position sensor (248', 248") for generating a rotor position signal as a function of the rotational position of the ring magnet (250), which at least one rotor position sensor (248', 248") is arranged outside the bearing tube (238).

14. The electric motor according to claim 13,
wherein the at least one rotor position sensor (248', 248") and the ring magnet (250) are arranged at approximately the same axial height with reference to the axial dimension of the rotor shaft (234).

15. The electric motor according to claim 13, wherein
the ring magnet (250) is arranged between the rotor shaft (234) and the at least one rotor position sensor (248', 248").

16. The electric motor according to claim 13, wherein
the rotor (222) comprises a rotor magnet (228) interacting with the stator (244), which magnet is arranged outside the bearing tube (238).

17. The electric motor according to claim 16, wherein
the rotor magnet (228) comprises n pole pairs, where n is a positive integer and
the ring magnet (250) is magnetized in such a way that it has a maximum of m pole pairs, where m is an integer not greater than n, and said ring magnet is magnetized so that a substantially sinusoidal profile of the magnetic flux occurs at its circumference (83).

18. The electric motor according to claim 17, wherein
the ring magnet (250) and the rotor magnet (228) are arranged relative to one another in such a way that each pole transition of the ring magnet (250) corresponds to a pole transition of the rotor magnet (228).

19. The electric motor according to claim 17, wherein
two rotor position sensors (248' 248") are provided, which sensors are arranged at a distance of approximately 90° electrical from one another with reference to the rotation axis of the ring magnet.

20. The electric motor according to claim 17, wherein
the ring magnet (250) comprises two pole pairs,
and two rotor position sensors (248', 248") are provided, which are arranged at an angular interval of approximately 45° mechanical relative to one another.

21. The electric motor according to claim 16, wherein
the at least one rotor position sensor (248', 248") is configured as an analog sensor.

22. The electric motor according to claim 16, wherein
the ring magnet (250) is axially offset relative to the rotor magnet (228), with reference to the axial dimension of the shaft, in order to minimize any influence by a magnetic flux of the rotor magnet (228) upon the rotor position signal.

23. The electric motor according to claim 16, further comprising
a housing, the ring magnet (250) being arranged in a first region of the housing, the rotor magnet (228) that interacts with the stator (244) being arranged in a second region of the housing,
and
a circuit board (246), supporting electronic components (320', 320", 320'") of the motor, provided between the first and the second region.

24. The electric motor according to claim 23, wherein
the at least one rotor position sensor (248', 248") is arranged on the circuit board (246).

25. The electric motor according to claim 13, wherein
the ring magnet (500) is magnetized in a pole-oriented lateral manner.

26. The electric motor according to claim 13, wherein
the ring magnet (82) and the rotor shaft (87) are connected to one another.

27. The electric motor according to claim 13, further comprising
a device (150) for ascertaining the rotor position, which device is configured as an absolute value sensor for the rotor position and serves to ascertain, from the at least one rotor position signal, the absolute value of the rotor position.

28. The electric motor according to claim 27, further comprising
a microprocessor (100) that constitutes at least a part of the device (150) for ascertaining the absolute value of the rotor position.

29. The electric motor according to claim 1, further comprising
an elastic element (109), arranged between the shaft (87) and the ring magnet (82), in order to compensate geometrical changes caused by changes in temperature.

30. The electric motor according to claim 29, wherein
a metal ring (107), made of a nonmagnetic material, is arranged between the elastic element (109) and the shaft (87).

31. The electric motor according to claim 1, wherein
the width (116) of the ring magnet (82) is in the range from approximately 3 mm to approximately 20 mm.

32. The electric motor according to claim 1, wherein
the outside diameter (112) of the ring magnet (82) is in the range from approximately 15 mm to approximately 50 mm.

33. The electric motor according to claim 1, wherein
there is provided, at a distance from the ring magnet (69; 82; 250) serving for motor control,
a circuit board (86; 246) on which are provided, at an angular distance (PHI) from one another,
two analog sensors (84', 84"; 248', 248") for detecting the sinusoidal magnetic flux density generated at the circuit board (86; 246) by the ring magnet (69; 82; 250) upon rotation of said magnet.

34. The electric motor according to claim 33, wherein
the rotor has a rotation axis, and the two analog sensors (84', 84"; 248', 248") are at substantially the same distance from said rotation axis.

35. The electric motor according to claim 33, wherein
the analog sensors (84', 84"; 248', 248") are arranged on the circuit board (86; 246) in substantially the same plane.

36. The electric motor according to claim 33, wherein the two sensors (84', 84"; 248', 248") have associated with them
a device (150) that is configured to calculate, from the output signals of said two sensors, the instantaneous absolute rotational angle position of the electric motor.

37. The electric motor according to claim 33, which further comprises
a bearing tube (238) for journaling of the motor shaft (232), the ring magnet (250) serving for motor control being arranged inside said bearing tube (238) on the motor shaft (232),
and the two analog galvanomagnetic sensors (248', 248") associated with said ring magnet (250) being arranged outside said bearing tube (238),
and at least the region of the bearing tube (238) that is located between the ring magnet (250) and the sensors (248', 248") being configured in a magnetically transparent manner.

* * * * *